(12) United States Patent
Liu et al.

(10) Patent No.: US 11,459,438 B2
(45) Date of Patent: Oct. 4, 2022

(54) HOLLOW POLYMER PARTICLES FOR THERMAL INSULATION

(71) Applicant: Arkema Inc., King of Prussia, PA (US)

(72) Inventors: Lily Liu, Oak Ridge, TN (US); Daniel E. Stark, Raleigh, NC (US); Wayne Devonport, Apex, NC (US); Donovan K. Lujan, Holly Springs, NC (US)

(73) Assignee: Arkema Inc., King of Prussia, PA (US)

( * ) Notice: Subject to any disclaimer, the term of this patent is extended or adjusted under 35 U.S.C. 154(b) by 120 days.

(21) Appl. No.: 16/340,183

(22) PCT Filed: Oct. 6, 2017

(86) PCT No.: PCT/US2017/055557
§ 371 (c)(1),
(2) Date: Apr. 8, 2019

(87) PCT Pub. No.: WO2018/071300
PCT Pub. Date: Apr. 19, 2018

(65) Prior Publication Data
US 2019/0309140 A1    Oct. 10, 2019

Related U.S. Application Data

(60) Provisional application No. 62/406,554, filed on Oct. 11, 2016.

(51) Int. Cl.
*B32B 5/16*    (2006.01)
*B29C 70/66*    (2006.01)
(Continued)

(52) U.S. Cl.
CPC .............. *C08J 9/32* (2013.01); *B29C 44/3461* (2013.01); *B29C 70/66* (2013.01);
(Continued)

(58) Field of Classification Search
CPC .. C08F 265/04; C08F 265/06; B29C 44/3461; B29C 70/66; B01J 13/22; Y10T 428/2991
See application file for complete search history.

(56) References Cited

U.S. PATENT DOCUMENTS 2,797,201 A    6/1957 Veatch et al.
4,427,836 A    1/1984 Kowalski et al.
(Continued)

FOREIGN PATENT DOCUMENTS

EP    1 197 503 A2    4/2002
EP    2 452 986 A1    5/2012
(Continued)

OTHER PUBLICATIONS

Sun & Luo, Fabrication of non-collapsed hollow polymeric nanoparticles with shell thickness in the order of ten nanometres and anti-reflection coatings, Soft Matter, 2011, 7, 871-875. (Year: 2011).*

*Primary Examiner* — Hoa (Holly) Le
(74) *Attorney, Agent, or Firm* — Lynn B. Morreale (57) ABSTRACT

A thermal insulating additive, product formed therefrom, and method of making the same, wherein the thermal insulating additive comprises a plurality of hollow polymeric particles having an average particle size up to about 0.3 micrometers. The hollow polymeric particles exhibit a mechanical strength in a compression test up to about 420 psi and a thermal conductivity that is less than 0.150 W/m-k. The hollow polymeric particles are individually formed as an alkaline swellable core that is at least partially encapsulated with two or more shell layers; the alkaline swellable core prior to swelling exhibits an average particle size that is less than about 50 nanometers.

20 Claims, 3 Drawing Sheets

(51) Int. Cl.
 *C08J 9/32* (2006.01)
 *B29C 44/34* (2006.01)
 *B29K 105/00* (2006.01)

(52) U.S. Cl.
 CPC .......... *B29K 2105/0076* (2013.01); *B29K 2995/0015* (2013.01); *C08J 2201/034* (2013.01); *C08J 2203/22* (2013.01); *C08J 2333/02* (2013.01); *C08J 2333/12* (2013.01); *C08J 2425/02* (2013.01); *C08J 2425/06* (2013.01); *C08J 2433/02* (2013.01); *C08J 2433/12* (2013.01); *G01N 2203/0019* (2013.01); *G01N 2203/0276* (2013.01)

(56) References Cited

U.S. PATENT DOCUMENTS

| | | | |
|---|---|---|---|
| 4,468,498 A * | 8/1984 | Kowalski | C09D 7/43 |
| | | | 525/301 |
| 4,594,363 A | 6/1986 | Blankenship et al. | |
| 4,880,842 A * | 11/1989 | Kowalski | C09D 7/65 |
| | | | 521/64 |
| 4,920,160 A | 4/1990 | Chip et al. | |
| 4,985,469 A | 1/1991 | Chip et al. | |
| 5,157,084 A * | 10/1992 | Lee | C08F 8/44 |
| | | | 525/301 |
| 5,216,044 A | 6/1993 | Hoshino et al. | |
| 5,229,209 A | 7/1993 | Gharapetian et al. | |
| 5,273,824 A | 12/1993 | Hoshino et al. | |
| 6,020,435 A | 2/2000 | Blankenship et al. | |
| 6,252,004 B1 | 6/2001 | Blanketship et al. | |
| 8,287,998 B2 | 10/2012 | Skelhorn | |
| 2002/0072560 A1* | 6/2002 | Bardman | C08F 265/06 |
| | | | 524/501 |
| 2004/0091709 A1 | 5/2004 | Ohmura et al. | |
| 2005/0059748 A1 | 3/2005 | Blankenship | |
| 2006/0009587 A1* | 1/2006 | Kim | C08F 291/00 |
| | | | 525/242 |
| 2009/0232901 A1 | 9/2009 | Walt et al. | |
| 2010/0010118 A1* | 1/2010 | Bardman | C08F 265/04 |
| | | | 523/201 |
| 2014/0050845 A1 | 2/2014 | Fung et al. | |

FOREIGN PATENT DOCUMENTS

| | | | |
|---|---|---|---|
| JP | 2011-195813 | 10/2011 | |
| JP | 5191729 B2 * | 5/2013 | ......... A61K 38/2013 |

* cited by examiner

HOLLOW POLYMER PARTICLES FOR THERMAL INSULATION

CROSS-REFERENCE TO RELATED APPLICATIONS

This application is a national stage application under 35 U.S.C. § 371 of PCT/US2017/055557 filed Oct. 6, 2017, which claims benefit to U.S. patent application Ser. No. 62/406,554, filed Oct. 11, 2016.

FIELD OF THE INVENTION

This disclosure relates generally to polymer particles that have an alkaline swellable core and to hollow polymer particles derived therefrom, as well as to the process used for the preparation thereof.

BACKGROUND OF THE INVENTION

The statements in this section merely provide background information related to the present invention and may not constitute prior art.

Hollow glass and ceramic micro-spheres, such as calcined day and silica aerogels, are commercially available for use in applications that require thermal insulation. However, since inorganic hollow micro-spheres are large having an overall diameter that is on the order of a few micrometers, their use is inherently limited. In addition, some hollow glass spheres can also be extremely hydrophobic and difficult to disperse in aqueous mediums, thus reducing their desirability for use in coating applications. Some inorganic hollow spheres also lack the synthetic capacity for low polydispersity, while other have a thin shell that is extremely sensitive and prone to damage.

European Patent No. 245286 describes an infrared reflective coating composition comprising, by weight percentage based on the total dry weight of the composition, 0.1% to 50% polymeric hollow particles, from 0.1% to 70% pigment particles and from 20% to 80% at least one polymeric binder, wherein the volume average particle size of the polymeric hollow particles is from 0.3 to 1.6 micrometers; and wherein the volume average particle size distribution of the polymeric hollow particles is such that 90% of particle lies within 10% of the volume average particle size.

U.S. Pat. No. 8,287,998 describes a thermal insulating coating composition that includes ceramic, glass and or polymeric hollow particles. The hollow particles are incorporated into the composition in order to reduce heat flow through the coating system. The hollow particles used in this coating composition have a particle size that ranges between 0.5-300 micrometers with between 5-200 micrometers being more preferred and between 10-150 micrometers being most preferred.

European Patent No. 2452986B1 describes the use of hollow polymeric particles having an average particle size between 0.3-1.6 micrometers to enhance the infrared reflectance of the coating composition. Polymeric hollow particles with an average particle size between 1.0-1.3 micrometers provide the highest total solar reflectance, as well as near infrared reflectance, when compared to the other compositions.

Methods for obtaining voided latex particles are also described, for example, in U.S. Pat. Nos. 4,427,836; 4,468,498; 4,594,363; 4,880,842; 4,920,160; 4,985,469; 5,216,044; 5,229,209; and 5,273,824, each of which is incorporated herein by reference in its entirety for all purposes. For example, particles may be made by: (1) examples 0-14 of U.S. Pat. No. 4,427,836, (2) examples 0-12 of U.S. Pat. No. 4,468,498, (3) examples 1-4 of U.S. Pat. No. 4,594,363, (4) examples I-IX of U.S. Pat. No. 4,880,842, (5) examples 1-13 of U.S. Pat. No. 4,920,160, (6) examples 1-7 of U.S. Pat. No. 4,985,469, (7) examples 1-7 of U.S. Pat. No. 5,216,044, (8) examples 1-8 of U.S. Pat. No. 5,229,209, and (9) examples 1-50 of U.S. Pat. No. 5,273,824.

SUMMARY OF THE INVENTION

The present disclosure generally provides a thermal insulating additive, a product composition formed therefrom, and a method of making the same. The thermal insulating additive comprises a plurality of hollow polymeric particles that exhibit an average particle size up to about 0.3 micrometers, alternatively in the range of about 0.2 micrometers up to about 0.3 micrometers. The hollow polymeric particles further exhibit a mechanical strength up to about 420 psi and a thermal conductivity that is less than 0.150 W/m-k.

The hollow polymeric particles are individually formed to have an alkaline swellable core that is at least partially encapsulated with two or more shell layers. The alkaline swellable core exhibits an average particle size that is less than about 50 nanometers. The alkaline swellable core comprises a reaction product formed from one or more hydrophilic monoethylenically unsaturated monomers with at least one nonionic monethylenically unsaturated monomer; the hydrophilic monomers being present in an amount ranging from about 5 wt. % to 100 wt. % and the nonionic monomers being present between 0 wt. % and about 95 wt. % based on the overall weight of the swellable core.

The hydrophilic, acid-functional monoethylenically unsaturated monomers used to form the swellable core are selected as one or more from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. The nonionic monoethylenically unsaturated monomer are selected as at least one from styrene, alpha-methyl styrene, p-methyl styrene, t-butyl styrene, vinyltoluene, ethylene, vinyl acetate, vinyl chloride, vinylidene chloride, (meth) acrylonitrile, (meth)acrylamide, methyl(meth)acrylate, ethyl (meth)acrylate, butyl(meth)acrylate, 2-ethylhexyl(meth) acrylate, hydroxyl ethyl(meth)acrylate, hydroxypropyl (meth)acrylate, benzyl (meth)acrylate, lauryl (meth) acrylate, oleyl(meth)acrylate, palmityl(meth)acrylate, stearyl(meth)acrylate and the like.

According to one aspect of the present disclosure, the two or more shell layers are formed such that each subsequent shell layer exhibits a greater degree of hydrophobicity. In other words, the first shell layer, which at least partially encapsulates the swellable core, is more hydrophobic than the swellable core; the next shell layer, which at least partially encapsulates the first shell layer and the swellable core, is more hydrophobic than the first shell layer; and so forth with the outermost shell layer exhibiting the greatest degree of hydrophobicity. For example, polymeric particles that comprise two shell layers may include an inner shell layer and an outer shell layer. The inner shell may be formed as a reaction product from one or more nonionic monoethylenically unsaturated monomers with at least one acid-functional monoethylenically unsaturated monomer; the acid-functional monoethylenically unsaturated monomers being present in an amount ranging from 0 wt. % to about 95.1 wt. %, and the nonionic monoethylenically unsaturated monomers being present between about 4.9 wt. % and 100 wt. %, based on the overall weight of the inner shell layer, such that the resulting inner shell layer is more hydrophobic than the swellable core.

The outer shell layer is formed to be more hydrophobic than the inner shell layer. The outer shell layer may be formed as a reaction product from one or more nonionic monoethylenically unsaturated monomers with at least one acid-functional monethylenically unsaturated monomer; the acid-functional monoethylenically unsaturated monomers being present in an amount ranging from 0 wt. % to about 15 wt. % and the nonionic monoethylenically unsaturated monomers being present between about 85 wt. % and 100 wt. % based on the overall weight of the outer shell layer. When desirable, the outer shell layer may comprise at least 5 wt. % based on the total or combined weight of both the inner and the outer shell layers. The nonionic monoethylenically unsaturated monomers and the acid-functional monoethylenically unsaturated monomers used to form the shell layers are selected as one or more of the nonionic and acid-functional monomers described above with respect to the swellable core and as further defined herein According to one aspect of the present disclosure, a product composition for use in an application requiring thermal energy management comprises the thermal insulating additive that is described above and further defined herein. The thermal energy management application may be, without limitation, a coating application for controlling heat transfer, as an additive to thermoplastics, an acoustic insulation application, a UV light protection application, or a paperboard application.

According to another aspect of the present disclosure, a method of forming the thermal insulating additive comprises providing a plurality of hollow polymeric particles in which each hollow polymeric particle is individually formed with an alkaline swellable core that is at least partially encapsulated with one or more shell layers. The alkaline swellable core exhibits an average particle size that is less than about 50 nanometers. The method further comprises allowing the alkaline swellable core in each hollow polymeric particle to swell, such that the hollow polymeric particles exhibit an average particle size up to about 0.3 micrometers. The hollow polymeric particles are then collected to form the thermal insulating additive in which the particles further exhibit a mechanical strength up to about 420 psi and a thermal conductivity that is less than 0.150 W/m-k.

The method may further include forming the alkaline swellable core as a reaction product between one or more hydrophilic monoethylenically unsaturated monomers with at least one nonionic monethylenically unsaturated monomer; the hydrophilic acid-functional monomers are present in an amount ranging from about 5 wt. % to 100 wt. % and the nonionic monomers are present between 0 wt. % and about 95 wt. % based on the overall weight of the swellable core as described above and further defined herein.

The method may also comprise forming the two or more shell layers such that the shell layers are individually formed as a reaction product from one or more nonionic monoethylenically unsaturated monomers with at least one acid-functional monethylenically unsaturated monomer, provided that each subsequent shell layer is more hydrophobic and that the innermost shell layer is more hydrophobic than the swellable core. The outer shell layer may comprise at least 5 wt. % of the total or combined weight of the inner shell layer and the outer shell layer. In the inner shell layer, the acid-functional monomers may be present in an amount ranging from 0 wt. % to about 95.1 wt. % and the nonionic monomers being present between about 4.9 wt. % and 100 wt. % based on the overall weight of the inner shell layer. In the outer shell layer, the acid-functional monomers may be present in an amount ranging from 0 wt. % to about 15 wt. % and the nonionic monomers being present between about 85 wt. % and 100 wt. % based on the overall weight of the outer shell layer as described above and further defined herein.

When desirable, the method may further comprise incorporating the thermal insulating additive into a product composition for use in a thermal energy management application. The thermal energy management application may include, but not be limited to, a coating application for controlling heat transfer, as an additive to thermoplastics, an acoustic insulation application, a UV light protection application, or a paperboard application to hinder light or sound through the applied medium.

Further areas of applicability will become apparent from the description provided herein. It should be understood that the description and specific examples are intended for the purpose of illustration only and are not intended to limit the scope the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, thermal insulating additive made and used according to the teachings contained herein is described throughout the present disclosure in conjunction with coatings in order to more fully illustrate the composition and the use thereof. The incorporation of the thermal insulating additive in other product compositions that are used in other applications or products are contemplated to be within the scope of the present disclosure. Possible alternative applications for use of products containing the particles of the present disclosure include acoustic insulation, UV light protection, paperboard applications and any other application that requires thermal energy management. Such product compositions may include but not be limited to coatings, thermoplastics, paints, adhesives, sealants, caulks, or inks. It should be understood that throughout the description, corresponding reference numerals indicate like or corresponding parts and features.

Figure 1:
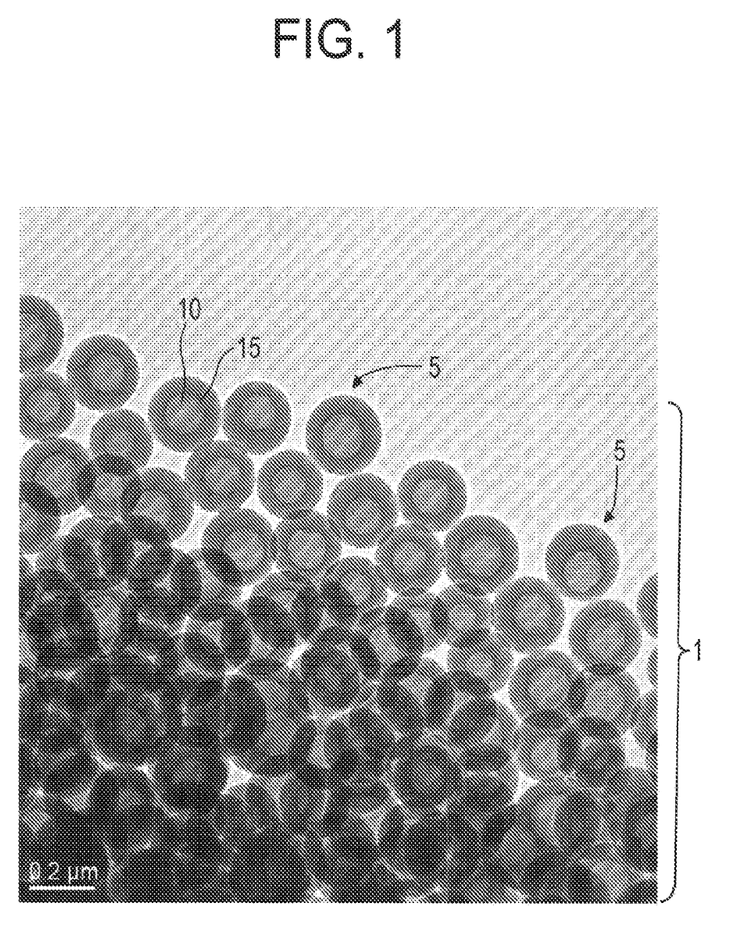
FIG. 1 is a transmission microscopic view of hollow polymeric particles formed according to the teachings of the present disclosure.

Referring to FIG. 1, the present disclosure generally provides a thermal insulating additive 1 that comprises a plurality of hollow polymeric particles 5, which exhibit an average particle size that is equal to less than about 0.35 micrometers; alternatively, up to about 0.30 micrometers; alternatively, in the range of about 0.2 micrometers to about 0.3 micrometers. The average particle size of the hollow polymeric particles 5 may be measured. The measurement of the average particle size and associated particle size distributions exhibited by the hollow polymer particles may be accomplished using any known technique, for example, sieving, microscopy, Coulter counting, dynamic light scattering, particle imaging analysis, transmission electron microscopy (TEM), or scanning electron microscopy (SEM), to name a few. Alternatively, the average particle size and associated particle size distributions exhibited by the hollow polymer particles is measured using dynamic light scattering, TEM, or SEM. Existing standard measurement protocols may be utilized when conducting the measurement of particle size. For example, the measurement of particle size conducted using dynamic light scattering may include but not be limited to, the use of standard protocols as described in ASTM E 2490-09 (ASTM International, West Conshohocken, Pa.) and/or or ISO 22412 (International Organization for Standardization, Geneva) with or without modifications.

These hollow polymeric particles 5 also exhibit a mechanical strength on the order of about 420 psi or more and a thermal conductivity that is less than 0.150 W/m-k. Alternatively, the mechanical strength is up to about 410 psi; alternatively, between about 50 psi and about 410 psi; alternatively, between about 100 psi and about 400 psi. Alternatively, the thermal conductivity of the hollow polymeric particles 5 is less than 0.100 W/m-k; alternatively, less than 0.075 W/m-k; alternatively between about 0.050 W/m-k to about 0.070 W/m-k. The mechanical strength can be measured by any known method, including, but not limited to a compression test. The thermal conductivity can be measured, without limitation, using a thermal constants analyzer (TPS 2500S, Hot Disk AB, Gothenburg, Sweden).

Still referring to FIG. 1, the hollow polymeric particles 5 are individually formed with each of the particles comprising, consisting of, or consisting essentially of an alkaline swellable core 10 that is at least partially encapsulated with one or more shell layers 15. The alkaline swellable cores in their unswollen state exhibit an average particle size that is less than about 50 nanometers; alternatively, less than about 40 nanometers; alternatively, less than about 35 nanometers; alternatively, between about 5 nanometers and about 40 nanometers.

The alkaline swellable core may be formed as a reaction product from the emulsion polymerization of one or more hydrophilic acid-functional, monoethylenically unsaturated monomers with at least one nonionic monoethylenically unsaturated monomer. The hydrophilic acid-functional monomers being present in an amount ranging from about 5 wt. % to 100 wt. % and the nonionic monomers being present between 0 wt. % and about 95 wt. based on the overall weight of the swellable core. Alternatively, the hydrophilic acid-functional monomers are present in an amount ranging from about 5 wt. % to about 50 wt. %; alternatively, between about 50 wt. % and 100 wt. %; alternatively, between about 25 wt. % and about 75 wt. %. Alternatively, the nonionic monomers are present in an amount ranging from about 50 wt. % to about 95 wt. %; alternatively, between about 0 wt. % and about 50 wt. %; alternatively, between about 25 wt. % and about 75 wt.

Several examples of hydrophilic acid-functional, monoethylenically unsaturated monomers used to form the swellable core include, but are not limited to acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like, as well as phosphorous-containing acid monomers including, without limitation, vinyl phosphonic acid, allyl phosphonic acid, 2-acrylamido-2-methylpropanephosphonic acid, α-phosphonostyrene, and 2-methylacrylamido-2-methylpropanephosphonic acid. Alternatively, the acid-functional, monoethylenically unsaturated monomers are acrylic acid and/or methacrylic acid.

Several examples of nonionic monoethylenically unsaturated monomers used to form the swellable core include, without limitation styrene, alpha-methyl, styrene, p-methyl styrene, t-butyl styrene, vinyltoluene, ethylene, vinyl acetate, vinyl chloride, vinylidene chloride, (meth)acrylonitrile, (meth)acrylamide, methyl(meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl (meth)acrylate, palmityl(meth)acrylate, stearyl(meth)acrylate and the like. Alternatively, the nonionic monoethylenically unsaturated monomers are methyl, methacrylate and/or butyl acrylate.

The two or more shell layers are individually selected as being a homopolymer or copolymer. The first shell polymer or inner shell layer is formed as a reaction product from 0 wt. % to about 95.1 wt. % of at least one acid-functional monoethylenically unsaturated monomer and from about 4.9 wt. % to 100 wt. %, based on the total weight of the first shell polymer, of a nonionic monoethylenically unsaturated monomer, provided that this innermost layer is more hydrophobic than the swellalbe core. Alternatively, the inner shell layer is formed using an acid-functional monoethylenically unsaturated monomer in an amount ranging from 0 wt. % to about 50 wt. %; alternatively, from about 50 wt. % to about 95.1 wt. %; alternatively, from about 25 wt. % to about 75 wt. % and a nonionic monoethylenically unsaturated monomer in an amount ranging from about 50 wt. % to 100 wt. %; alternatively, from about 4.9 wt. % to about 50 wt. %; alternatively, from about 25 wt. % to about 75 wt. %.

This first or inner shell layer at least partially encapsulates the swellable core. Alternatively, the first shell layer fully encapsulates the swellable core. The ratio of the weight of the core polymer to the weight of the first shell polymer ranges from about 10:1 to about 1:100; alternatively, from about 5:1 to about 1:80; alternatively, from about 1:1 to about 1:60. The first shell layer may also exhibits a glass transition temperature ($T_g$) that is greater than −50° C.; alternatively, greater than 0° C.; alternatively, up to about 150° C. The glass transition temperature ($T_g$) may be determined using differential scanning calorimetry (DSC), or any other known technique.

Several examples of nonionic monoethylenically unsaturated monomers used to from the first shell layer include, but are not limited to those described above with respect to forming the swellable core. Alternatively, the nonionic monoethylenically unsaturated monomers are methyl methacrylate and/or butyl acrylate. Several examples of acid-functional monoethylenically unsaturated monomers used to form the first shell layer include, without limitation those described above with respect to forming the swellable core; alternatively, methacrylic acid.

A second shell layer formed on the first shell layer. This second shell layer at least partially encapsulates the first or innermost shell layer and the swellable core. When only two shell layers are present, this second shell layer may also be called the outer shell layer. The outer shell layer comprises from 0 wt. % to about 15 wt. %, alternatively, from about 0.1 wt. % to about 10 wt. %, of at least one acid-functional monoethylenically unsaturated monomer and from about 85 wt. % to 100 wt. %, alternatively, from about 90 wt. % to about 99.9 wt. %, based on the total weight of the outer shell polymer, of an nonionic monoethylenically unsaturated monomer.

The second shell layer exhibits a glass transition temperature (Tg) that is at least the same as or less than the first shell layer; alternatively, the glass transition temperature (Tg) of the second shell layer is less than the Tg of the first shell layer. This second shell layer may also comprises at least 5 wt. %; alternatively 10 wt. % or more, based on the total or combined weight of both the inner or first shell layer and the outer or second shell layer. After the application of the outer shell layer the layered particles that are formed are neutralized with a base such that the core is swelled, thereby, forming the hollow particles.

Several examples of nonionic monoethylenically unsaturated monomers used to from the outer shell layer include, but are not limited to those described above with respect to forming the swellable core; alternatively, styrene, methyl methacrylate and/or butyl acrylate. Several examples of acid-functional monoethylenically unsaturated monomers used to form the outer shell layer include, with limitation those described above with respect to forming the swellable core; alternatively, methacrylic acid. Alternatively, the outermost shell layer may be substantially comprised of non-ionic monoethylenically unsaturated monomers.

Similarly, when more than two shell layers are utilized, each subsequent shell layer applied is more hydrophobic than the previously applied shell layer with the innermost shell layer being the most hydrophilic and the outermost shell layer be the most hydrophobic. All of the shell layers are more hydrophobic than the swellable core. Each subsequent shell layer incorporated into the hollow particles may comprise compositions derived from the nonionic and acid-functional monethylenically unsaturated monomers previously described for the swellable core, the inner shell layer, and the outer shell layer. The outermost shell layer may be substantially comprised of nonionic monoethylenically unsaturated monomers.

Figure 2:
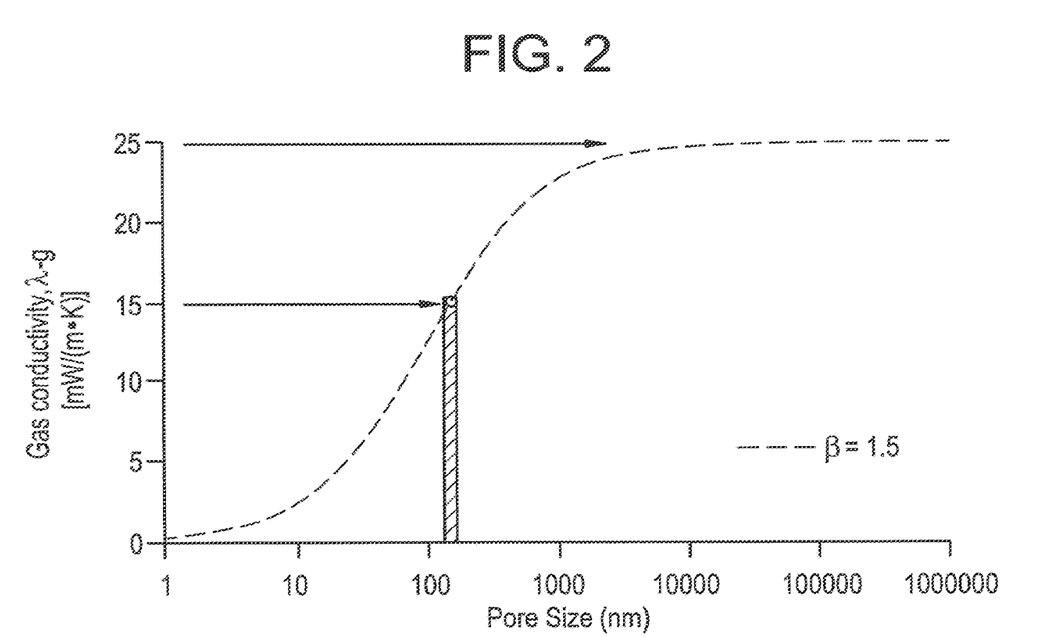
FIG. 2 is a graphical representation of the theoretical thermal conductivity for air-filled porous system plotted as a function of pore size.

Referring now to FIG. 2, the theoretical thermal conductivity of a porous system containing air in the hollow voids or pores is plotted as a function of pore size. The existence of small hollow particles leads to a higher probability of collisions with the particles' walls instead of with other gas molecules, which creates what is called the Knudsen effect. When the size of the void in the porous system (i.e., the "pore size") reaches about 1 micrometer (e.g., 1,000 nm), the thermal conductivity can be equivalent to that of air at 25 mW/m-k (0.250 W/m-k). In other words, the Knudson effect becomes negligible for pore sizes larger than about 1 micrometer. When the pore size is below 1 micrometer, the thermal conductivity for the porous system can be less than that exhibited by air because collisions between the gas molecules and the hollow particles are elastic and transfer small amounts of energy as compared to the collisions that occur solely between gas molecules.

The hollow polymeric particles formed according to the teachings of the present disclosure exhibit a thermal conductivity that is less than 0.150 W/m-k; alternatively, less than 0.130 W/m-k; alternatively, less than 0.110 W/m-k; alternatively, between 0.05 W/m-k and 0.110 W/m-k; alternatively, between about 0.05 W/m-k and 0.07 W/m-k. The thermal conductivity of the hollow polymeric particles may be measured using any known method, including but not limited to the use of a thermal constants analyzer.

The hollow polymeric particles are formed to have a mechanical strength that is up to about 420 psi. Alternatively, the mechanical strength is up to about 410 psi; alternatively, between about 50 psi and about 410 psi; alternatively, between about 100 psi and about 400 psi. The mechanical strength may be measured using any known method, including, without limitation, a compression test.

The hollow particles of the present disclosure may be used in thermal insulation applications because they provide the benefit of lower or reduced thermal conductivity. These hollow polymeric particles also exhibit a high mechanical strength that allows the particles to maintain their shape and not break or deform during both preparation and application thereof. The reduction in thermal conductivity associated with these hollow particles is believed to be due to the entrapment of air within the hollow cores therein. The small hollow particles of the present disclosure perform comparably or better than silica glass beads (50-100 mW/m-k). The thermal conductivity of the small hollow particles may be further decreased, when desired, by exchanging the air encapsulated within the particles' pores with a gas that exhibits a lower gas conduction value or by creating a vacuum within the hollow void space of the particles.

The small hollow particles of the present disclosure provide similar if not superior thermal insulating performance than larger particles when utilized in a formulated product, such as coatings, paints, thermoplastics, adhesives, sealants, inks, or the like. Modification of the crosslinking density and shell thickness of the hollow polymer particles allows these hollow particles to be used in formulations that pass through compounding or extrusion processes during their preparation or application. The hollow polymeric particles are easily dispersed in aqueous mediums, have a strong high $T_g$ non-film forming shell, and produce particle size distributions with low polydispersity; alternatively, with a polydispersity that is less than about 1.3. The small hollow particles exhibit thermal insulating properties when used as an additive in a product formulation.

According to another aspect of the present disclosure, a product composition for use in an application requiring thermal energy management comprises the thermal insulating additive that is described above and further defined herein. The thermal energy management application may be, without limitation, a coating application, as an additive to thermoplastics, a UV light protection application, a paperboard application, or a composite application to hinder light or sound through the applied medium. A specific example of a composite application includes, without limitation, an application in which the composite structure comprises a PVC or PMMA composite modified by the addition of the thermal insulating additive.

According to another aspect of the present disclosure, the product composition may be a latex composition is formed that comprises a plurality of the layered polymer particles dispersed in an aqueous medium. These latex compositions may comprise up to about 50 wt. %, alternatively, up to about 45 wt. % of the thermal insulating additive based on the weight of the total active polymers in the latex. The lower limit for incorporation of the thermal insulating additive into the latex composition may set at about 1 wt. %; alternatively, 5 wt. %; alternatively, about 15 wt. %; alternatively, about 25 wt. %; alternatively, about 30 wt. % based on the weight of the total active polymers in the latex.

The latex composition may be used, with or without the incorporation of other additives, as a coating, as an additive to thermoplastics, paint, adhesive, sealant, caulk, or ink used in an application requiring reduced thermal conductivity. The coating, paint, adhesive, sealant, caulk, or ink may be used, without limitation, in a traffic paint application, in a decorative or architectural application, as a pressure-sensitive adhesive, in a deck application, in a roof application in a "dry-fall" application, or in a primer application.

The latex compositions may further comprise, consist of, or consist essentially of one or more additional polymers, as well as any other known or desired additives. The additional polymers may include, but not be limited to, a polymer or copolymer that is derived from one or more of (meth) acrylate, vinyl aromatic, ethylenically unsaturated aliphatic, or vinyl ester monomers, as well as various combinations thereof. The other additives, may comprise without limitation, any type of pigments or colorants, fillers, dispersants or surfactants, coalescent agents, pH neutralizing agents, plasticizers, defoamers, surfactants, thickeners, biocides, co-solvents, rheology modifiers, wetting or spreading agents, leveling agents, conductive additives, adhesion promoters, anti-blocking agents, anti-cratering agents or anti-crawling, agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellents, or stain resistant agents, as well as mixtures and combinations thereof. The selection of additives incorporated into a coating composition is determined based on a variety of factors, including the nature of the acrylic polymer or latex dispersion and the intended use of the coating composition, to name a few.

Several examples of pigments and colorants include, without limitation, metal oxides, such as titanium dioxide, zinc oxide, or iron oxide, as well as organic dyes, or combinations thereof. Examples of fillers may include, but not be limited to, calcium carbonate, nepheline syenite, feldspar, diatomaceous earth, talc, aluminosilicates, silica, alumina, day, kaolin, mica, pyrophyllite, perlite, baryte, or Wollastonite, and combinations thereof.

Several examples of co-solvents and plasticizers include ethylene glycol, propylene glycol, diethylene glycol, and combinations thereof, among others. Typical coalescents, which aid in film formation during drying, include but are not limited to, ethylene glycol monoethyl ether, ethylene glycol monobutyl ether, ethylene glycol monoethyl ether acetate, ethylene glycol monobutyl ether acetate, diethylene glycol monobutyl ether, and diethylene glycol monoethyl ether acetate, as well as combinations thereof.

Several examples of dispersants may include, without limitation, any known nonionic surfactants, such as ammonium, alkali metal, alkaline earth metal, and lower alkyl quaternary ammonium salts of sulfosuccinates, higher fatty alcohol sulfates, aryl sulfonates, alkyl sulfonates, alkylaryl sulfonates, and/or ionic surfactants, such as alkylphenoxy polyethoxyethanols or ethylene oxide derivatives of long chain carboxylic acids, as well as polyacid dispersants, such as polyacrylic acid or polymethylacrylic acid or salts thereof, and hydrophobic co-polymeric dispersants, such as co-polymers of acrylic acid, methacrylic acid, or maleic acid with hydrophobic monomers.

Several examples of the thickening agents may include, without limitation, hydrophobically modified ethylene oxide urethane (HEUR) polymers, hydrophobically modified alkali soluble emulsion (HASE) polymers, hydrophobically modified hydroxyethyl celluloses (HMHECs) hydrophobically modified polyacrylamide, and combinations thereof.

The incorporation of various defoamers, such as, for example, polydimethylsiloxanes (PDMS) or polyether-modified polysiloxanes, may be done to minimize frothing during mixing and/or application of the coating composition. Suitable biocides can be incorporated to inhibit the growth of bacteria and other microbes in the coating composition during storage.

Coatings, which may include, without limitation, paints, adhesives, sealants, caulks, and inks, formed from the latex product compositions described herein, as well as methods of forming these coatings are believed to be within the scope of the present disclosure. Generally, coatings are formed by applying a coating formulation described herein to a surface, and allowing the coating to dry to form the coating or film. The resulting dried coatings typically compose, at minimum, a plurality of layered polymer particles. The coating formulations and/or the dried coatings can further comprise one or more additional polymers and/or additives as described above or known to one skilled in the art. The coating thickness can vary depending upon the application of the coating. The thickness of the coating may be any thickness desirable for use in a particular application; alternatively, the range for the dry thickness of the coating is between about 0.025 mm (1 mil) to about 2.5 mm (100 mils).

The latex compositions can be applied to a variety of different surfaces including, but not limited to metal, asphalt, concrete, stone, ceramic, wood, plastic, polymer, polyurethane foam, glass, and combinations thereof. The latex product compositions can be applied to the interior or exterior surfaces of a commercial product or manufactured good or item. When desirable, the surface may be an architectural surface, such as a roof, a wall, a floor, or a combination thereof. The latex compositions may be applied using any available method, including, without limitation, rolling, brushing, flow coating, dip coating, or spray coating, including but not limited to air spray, air-assisted spray, airless spray, high volume-low pressure (HVLP) spray, and air-assisted airless spray.

Figure 3:
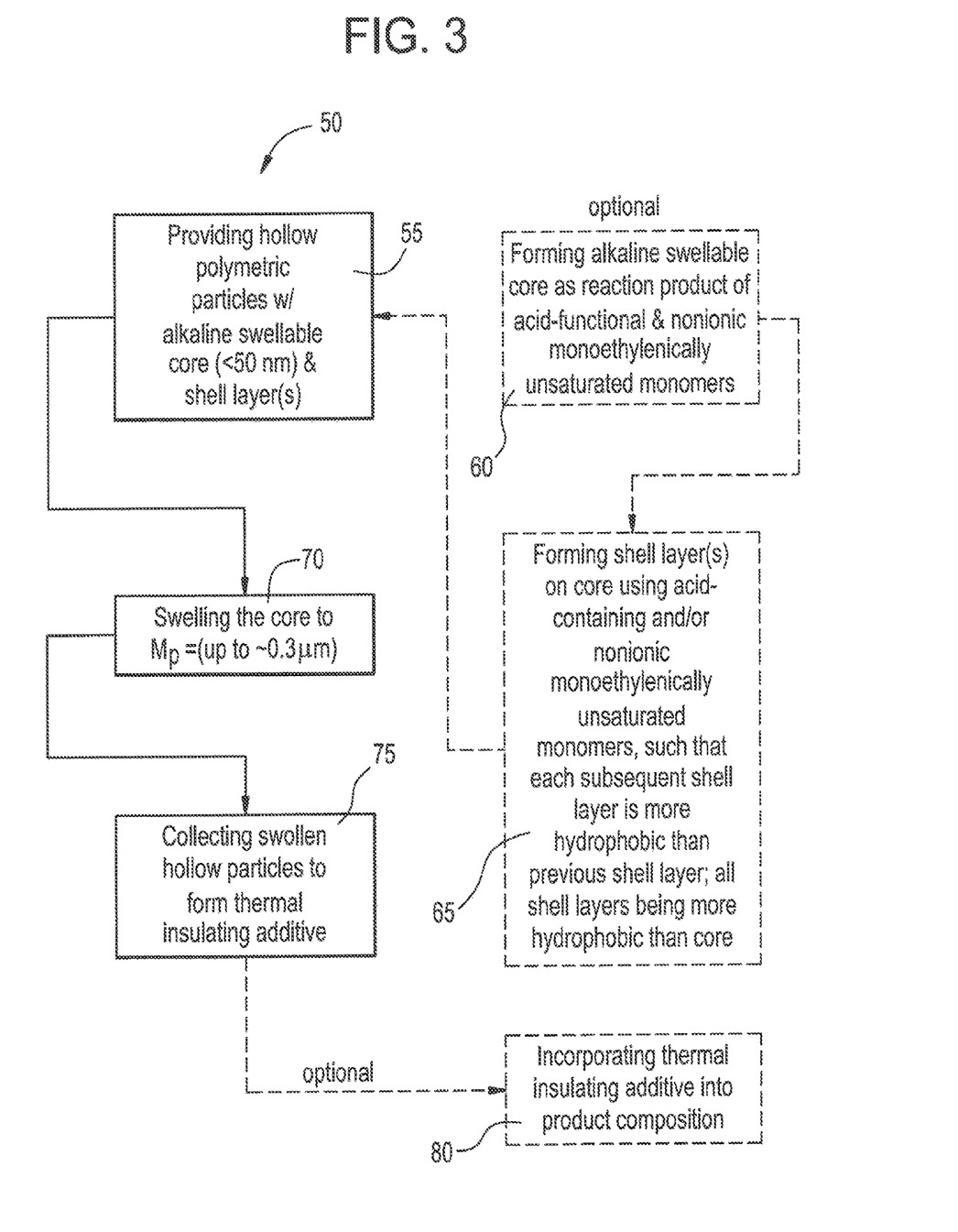
FIG. 3 is a schematic representation of a method for forming the hollow polymeric particles, as well as incorporating the particles into a product composition, according to the teachings of the present disclosure.

Referring now to FIG. 3, a method 50 of forming the thermal insulating additive comprises providing 55 a plurality of hollow polymeric particles in which each hollow polymeric particle is individually formed with an alkaline swellable core that is at least partially encapsulated with two or more shell layers. The alkaline swellable core exhibits an average particle size prior to swelling that is less than about 50 nanometer. Optionally, the method may further comprise forming 60 the alkaline swellable cores as a reaction product between hydrophilic and nonionic monoethylenically unsaturated monomers and forming 65 one or more shell layers that at least partially encapsulates the swellable core. The shell layers being formed as a reaction product between acid-containing and/or nonionic monoethylenically unsaturated monomers. Alternatively, the outermost shell layer may be substantially comprised of nonionic monoethylenically unsaturated monomers.

The method 50 also comprises allowing 70 the alkaline swellable core in each hollow polymeric particle to swell, such that the hollow polymeric particles exhibit an average particle size up to about 0.3 micrometers, alternatively in the range up to about 0.2 micrometers; alternatively, between about 0.2 micrometers and about 0.3 micrometers. The hollow polymeric particles are then collected 75 to form the thermal insulating additive in which the particles further exhibit a mechanical strength in a compression test up to about 420 psi and a thermal conductivity that is less than 0.150 W/m-k.

As used herein, collecting the swollen hollow polymeric particles includes either collecting the particles in powder form or maintaining them as an aqueous dispersion. In other words, the thermal insulating additive may be stored and subsequently utilized either as a powder or in the form of an aqueous dispersion of particles. The hollow polymeric particles may be collected in powder form using any commercially available or known method, including but not limited to, the use of filtration, sieving, centrifugation, spray drying, freeze drying, drum drying, electrostatic precipitation, and size exclusion chromatography, to name a few. Alternatively, the particles may be collected using spray drying or filtration. Any known variations in the collection techniques may be utilized without exceeding the scope of the present disclosure. For example, filtration may include without limitation, hot filtration, cold filtration, or vacuum filtration, as well as the use of different types of filter media, e.g., a surface filter or a depth filter. Spray drying may include but not be limited to the use of a spray dryer in which the atomizer or nozzle is a rotary disk, a swirl nozzle, or an ultrasonic nozzle, to name a few.

Still referring to FIG. 3, when desirable, the method 50 may further comprise incorporating 80 the thermal insulating additive into a product composition for use in a energy management application, such as, without limitation, a coating application, a UV light protection application, or a paperboard application. The thermal insulating additive may be incorporated into the product composition by either adding the additive in powder form or as an aqueous dispersion.

Other aspects of the invention include:
1. A thermal insulating additive, the thermal insulating additive comprising a plurality of hollow polymeric particles having an average particle size up to about 0.3 micrometers;
wherein the hollow polymeric particles exhibit a mechanical strength in a compression test up to about 420 psi and a thermal conductivity that is less than 0.150 W/m-k.
2. The additive according to Aspect 1, wherein the hollow polymeric particles are individually formed as an alkaline swellable core that is at least partially encapsulated with two or more shell layers; the alkaline swellable core prior to swelling exhibits an average particle size that is less than about 50 nanometers;
wherein the shell layers are more hydrophobic than the swellable core.
3. The additive according to Aspect 2, wherein the alkaline swellable core comprises a reaction product formed from one or more hydrophilic acid-functional, monoethylenically unsaturated monomers with at least one nonionic monethylenically unsaturated monomer; the hydrophilic acid-functional monomers being present in an amount ranging from about 5 wt. % to 100 wt. % and the nonionic monomers being present between 0 wt. % and about 95 wt. % based on the overall weight of the swellable core;
wherein the two or more shell layers comprise:
an inner shell layer formed as a reaction product from one or more nonionic monoethylenically unsaturated monomers with at least one acid-functional monethylenically unsaturated monomer; the acid-functional monomers being present in an amount ranging from 0 wt. % to about 95.1 wt. % and the nonionic monomers being present between about 4.9 wt. % and 100 wt. % based on the overall weight of the inner shell layer; and
an outer shell layer formed as a reaction product from one or more nonionic monoethylenically unsaturated monomers with at least one acid-functional monethylenically unsaturated monomer; the acid-functional monomers being present in an amount ranging from 0 wt. % to about 15 wt. % and the nonionic monomers being present between about 85 wt. % and 100 wt. % based on the overall weight of the outer shell layer;
wherein the outer shell layer is more hydrophobic than the inner shell layer.
4. The additive according to Aspect 3, wherein the hydrophilic acid-functional, monoethylenically unsaturated monomers used to form the swellable core, as well as the shell layers are independently selected as one or more from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate, vinyl phosphonic acid, allyl phosphoric acid, 2-acrylamido-2-methylpropanephosphonic acid, α-phosphonostyrene, and 2-methylacrylamido-2-methylpropanephosphonic acid; and the nonionic monethylenically unsaturated monomer are independently selected as at least one from styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, methyl(meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl(meth)acrylate, palmityl(meth)acrylate, and stearyl(meth)acrylate.
5. The additive according to any of Aspect 3 or 4, wherein the outer shell layer comprises at least 5 wt. % of the total or combined weight of the inner shell layer and the outer shell layer.
6. A product composition for use in an application requiring thermal energy management, the product composition comprises a thermal insulating additive that includes a plurality of hollow polymeric particles having an average particle size up to about 0.3 micrometers;
wherein the hollow polymeric particles exhibit a mechanical strength in a compression test up to about 420 psi and a thermal conductivity that is less than 0.150 W/m-k.
7. The product composition according to Aspect 6, wherein the thermal energy management application is a coating application, as an additive to thermoplastics, an acoustic insulation application, a UV light protection application, or a paperboard application.
8. The product composition according to any of Aspect 6 or 7, wherein the hollow polymeric particles are individually formed as an alkaline swellable core that is at least partially encapsulated with two or more shell layers;
wherein the alkaline swellable core prior to swelling exhibits an average particle size that is less than about 50 nanometers
wherein the shell layers are more hydrophobic than the swellable core.
9. The product composition according to Aspect 8, wherein the alkaline swellable core comprises a reaction product formed from one or more hydrophilic acid-functional, monoethylenically unsaturated monomers with at least one nonionic monethylenically unsaturated monomer; the hydrophilic acid-functional monomers being present in an amount ranging from about 5 wt. % to 100 wt. % and the nonionic monomers being present between 0 wt. % and about 95 wt. % based on the overall weight of the swellable core.
wherein the two or more shell layers comprise:
an inner shell layer formed as a reaction product from one or more nonionic monoethylenically unsaturated monomers with at least one acid-functional monethylenically unsaturated monomer; the acid-functional monomers being present in an amount ranging from 0 wt. % to about 95.1 wt. % and the nonionic monomers being present between about 4.9 wt. % and 100 wt. % based on the overall weight of the inner shell layer; and an outer shell layer formed as a reaction product from one or more nonionic monoethylenically unsaturated monomers with at least one acid-functional monethylenically unsaturated monomer; the acid-functional monomers being present in an amount ranging from 0 wt. % to about 15 wt. % and the nonionic monomers being present between about 85 wt. % and 100 wt. % based on the overall weight of the outer shell layer;

wherein the outer shell layer comprises at least 5 wt. % of the total or combined weight of the inner shell layer and the outer shell layer wherein the outer shell layer is more hydrophobic than the inner shell layer.

10. The product composition according to Aspect 9, wherein the hydrophilic acid-functional, monoethylenically unsaturated monomers used to form the swellable core, as well as the shell layers, are independently selected as one or more from acrylic acid, methacrylic acid, acryloxypropionic acid, (meth)acryloxypropionic acid, itaconic acid, aconitic acid, maleic acid or anhydride, fumaric acid, crotonic acid, monoethyl maleate, monomethyl fumarate, and monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid; and the nonionic monethylenically unsaturated monomers are independently selected as at least one from styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, methyl (meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl(meth)acrylate, palmityl (meth)acrylate, and stearyl(meth)acrylate.

11. A method of forming thermal insulating additive, the method comprising;

providing a plurality of hollow polymeric particles; the hollow polymeric particles being individually formed as an alkaline swellable core that is at least partially encapsulated with two or more shell layers; the alkaline swellable core exhibiting an average particle size that is less than about 50 nanometers;

allowing the alkaline swellable core in each hollow polymeric particle to swell, such that the hollow polymeric particles exhibit an average particle size up to about 0.3 micrometers; and collecting the swollen hollow polymeric particles to form the thermal insulating additive;

wherein the hollow polymeric particles exhibit a mechanical strength in a compression test up to about 420 psi and a thermal conductivity that is less than 0.150 W/m-k wherein the shell layers are more hydrophobic than the swellable core.

12. The method according to Aspect 11, wherein the method further includes forming the alkaline swellable core as a reaction product between one or more hydrophilic acid-functional, monoethylenically unsaturated monomers with at least one nonionic monoethylenically unsaturated monomer; the hydrophilic acid-functional monomers are present in an amount ranging from about 5 wt. % to 100 wt. % and the nonionic monomers are present between 0 wt. % and about 95 wt. % based on the overall weight of the swellable core.

wherein the method further comprises forming the two or more shell layers such that an inner shell layer and an outer shell layer are individually formed as a reaction product from one or more nonionic monoethylenically unsaturated monomers and/or acid-functional monethylenically unsaturated monomers; the outer shell layer comprising at least 5 wt. % of the total or combined weight of the inner shell layer and the outer shell layer;

wherein in the inner shell layer the acid-functional monomers are present in an amount ranging from 0 wt. % to about 95.1 wt. % and the nonionic monomers being present between about 4.9 wt. % and 100 wt. % based on the overall weight of the inner shell layer;

wherein in the outer shell layer the acid-functional monomers are present in an amount ranging from 0 wt. to about 15 wt. % and the nonionic monomers being present between 85 wt. % and 100 wt. % based on the overall weight of the outer shell layer wherein the outer shell layer is more hydrophobic than the inner shell layer.

13. The method according to Aspect 12, wherein the hydrophilic acid-functional, monoethylenically unsaturated monomers used to form the swellable core, as well as shell layers, are independently selected as one or more from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid; and the nonionic monethylenically unsaturated monomer are independently selected as at least one from styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, methyl(meth) acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl(meth)acrylate, palmityl(meth) acrylate, and stearyl(meth)acrylate.

14. The method according to any of Aspect 11-13, wherein the method further comprises incorporating the thermal insulating additive into a product composition for use in a thermal energy management application.

15. The method according to Aspect 14, wherein the thermal energy management application is a coating application, as an additive to thermoplastics, an acoustic insulation application, a UV light protection application, or a paperboard application.

Example 1

Thermal Conductivity of Hollow Polymeric Particles

The thermal insulating additive, which comprises a plurality of hollow particles, is incorporated into a ~0.5 mm (20 mils) thick film. A predetermined amount of the hollow polymeric particles formed according to the teachings of the present disclosure is added to a latex binder. The resulting product formulation comprises about 30 wt. % hollow polymer particles in Run No. 1 and about 17 wt. % hollow polymer particles in Run No. 2. A film was then formed on release paper from the each product formulation using a ~0.5 mm (20 mils) draw down bar. The films are then placed in a 60° C. oven for 1 hour or held at room temperature for a longer period of time to dry.

The thermal conductivity of the films is measured using a Hot Disk TPS 2500S Thermal Constants Analyzer (Hot Disk AB, Gothenburg, Sweden & ThermTest Inc., Fredericton, Canada). The test is conducted by placing a sensor between two 60 mm diameter films, followed by uniformly compressing the films between two 25 mm thick stainless steel cylinders with known thermal conductivity and a 2 kg brass weight. When necessary, powder samples may also be tested by placing them in a milled aluminum cup and compressing them with a ram under a stainless steel cylinder and a 2 kg brass weight. The thermal conductivity measurements obtained for the hollow polymeric particles in the films of Run No.'s 1 and 2, as well as for a control film comprising only the vinyl acrylic binder (Encor® 310) are provided in Table 1 below.

TABLE 1

Thermal Conductivity Results for Latex film containing Small Hollow Particles

|  | Average Thermal Conductivity (W/m-k) | TC Standard Deviation (W/m-k) | Standard Deviation % of Average TC (W/m-k) |
| --- | --- | --- | --- |
| Control | 0.154 | 0.0004 | 0.273 |
| Run No. 1 | 0.094 | 0.0026 | 2.737 |
| Run No. 2 | 0.106 | 0.0002 | 0.207 |

The thermal conductivity of the small hollow particles incorporated into Run No.'s 1 and 2 were also measured using a thermal constants analyzer (TPS 2500S, Hot Disk AB, Sweden). The thermal conductivity of the small hollow particles in Run No.'s 1 and 2 were measured to be on the order of 0.06 mW/m-k.

This Example demonstrates that the thermal conductivity exhibited by the small hollow particles of the present disclosure is lower than the average thermal conductivity of a comparable control film. The thermal conductivity measured for the small hollow polymeric particles is less than 0.150 W/m-k.

Example 2

Compression Test for Hollow Particles

Compressibility tests may be performed by using a powder rheometer (FT-4, Freeman Technology, United kingdom) or a hydraulic press. The compressibility test using a powder rheometer is described in the standard method W7008 provided by the manufacturer (Freeman Technology). This standard measurement utilizes a vented piston to compress the sample under increasing normal stress. For each compression step, the normal stress is held constant for 60 seconds in order to allow the powder to stabilize. For this experiment, compression steps from 0.5 kPa to 80 kPa are applied to the powder column and the change in volume is measured for each applied normal stress.

When the compressibility test is done by a hydraulic press, about 25 cm$^3$ of powder is loaded in a rectangular mold having an area of 15.8 inch square. A constant normal force is applied to the sample at room temperature with a holding time of 10 minutes.

Example 3

Emulsion Polymer Composition with Four Shell Layers

This example demonstrates the formation of hollow particles having an average diameter of approximately 0.2-0.3 μm as measured using dynamic light scattering (Nanotrac®, Microtrac Inc., a Nikkiso group, Pennsylvania) with confirmation provided through the use of both transmission electron microscopy (2000FX, JEOL TEM, Massachusetts) and scanning electron microscopy (S3200, Hitachi High Technologies America, Illinois). The monomer levels are predetermined and controlled in order to produce an alkaline swellable core having an average particle diameter of about 40 nanometers. Two shell layers are then applied to this swellable core.

The monomer pre-emulsions for the core are prepared by reacting a prescribed amount of methyl methacrylate with methacrylic acid. Then a different ratio of methyl methacylate and methacrylate acid monomers used to form the 1$^{st}$ or inner shell layer are added to the reactor containing the swellable core particles.

Three monomer pre-emulsions used to from the 2$^{nd}$, 3$^{rd}$, and 4$^{th}$ shell layers are prepared. Shell layer 2 contains methyl methacrylate, methacrylic acid, and styrene monomers. Shell layer 3 contains styrene, divinyl benzene (80%), and oleic acid. Shell layer 4 contains neat styrene.

The 2$^{nd}$ shell monomer pre-emulsion mixture is fed to the reactor and allowed to react. The 3$^{rd}$ shell monomer pre-emulsion mixture is then fed to the reactor and allowed to react. Immediately after this base feed, the 4$^{th}$ shell pre-emulsion mixture is added to the reactor. The hollow particles so formed are then collected and stored for characterization and further utilization.

Within this specification, embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and, equitably entitled.

What is claimed is:

1. A thermal insulating additive, the thermal insulating additive comprising a plurality of hollow polymeric particles having an average particle size from about 0.2 to about 0.3 micrometers;
   said hollow polymeric particles formed from an alkaline swellable core that is at least partially encapsulated with two or more shell layers, wherein the alkaline swellable core prior to swelling exhibits an average particle size that is less than 50 nanometers (0.05 micrometers) and the shell layers are more hydrophobic than the swellable core;
at least one of said two or more shell layers being an inner/first shell layer that at least partially encapsulates the swellable core and the other of said two or more shell layers being an outer/second shell layer that at least partially encapsulates the inner/first shell layer and the swellable core;
wherein the glass transition temperature (Tg) of the outer/second shell layer is equal to or less than the glass transition temperature (Tg) of the inner/first shell layer; and
wherein the hollow polymeric particles exhibit a mechanical strength in a compression test up to about 420 psi and a thermal conductivity that is less than 0.150 W/m-k.

2. The additive according to claim 1, wherein the alkaline swellable core comprises a reaction product formed from one or more hydrophilic acid-functional, monoethylenically unsaturated monomers with at least one nonionic monethylenically unsaturated monomer;
wherein, the hydrophilic acid-functional monomers are present in an amount ranging from about 5 wt. % to 100 wt. % and the nonionic monomers are present between 0 wt. % and about 95 wt. % based on the overall weight of the swellable core.

3. The additive according to claim 2, wherein the hydrophilic acid-functional, monoethylenically unsaturated monomers used to form the swellable core are selected as one or more from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid; and the nonionic monethylenically unsaturated monomer are selected as at least one from styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, methyl(meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl(meth)acrylate, palmityl(meth)acrylate, and stearyl(meth)acrylate.

4. The additive according to claim 1, wherein the two or more layers comprise:
An inner shell layer formed as a reaction product from one or more nonionic monoethylenically unsaturated monomers with at least one acid-functional monethylenically unsaturated monomer; the acid-functional monomers being present in an amount ranging from 0 wt. % to about 95.1 wt. % and the nonionic monomers being present between about 4.9 wt. % and 100 wt. % based on the overall weight of the inner shell layer; and
an outer shell layer formed as a reaction product from one or more nonionic monoethylenically unsaturated monomers with at least one acid-functional monethylenically unsaturated monomer; the acid-functional monomers being present in an amount ranging from about 0 wt. % to 15 wt. % and the nonionic monomers being present between 85 wt. % and about 100 wt. % based on the overall weight of the outer shell layer;
wherein the outer shell layer is more hydrophobic than the inner shell layer.

5. The additive according to claim 4, wherein the nonionic monoethylenically unsaturated monomers used to form the shell layers are selected as one or more from the group consisting of styrene, alpha-methyl styrene, p-methyl styrene, t-butyl styrene, vinyltoluene, ethylene, vinyl acetate, vinyl chloride, vinylidene chloride, methyl(meth)acrylate, ethyl(meth)acrylate, butyl(meth)acrylate, 2-ethylhexyl (meth)acrylate, hydroxyl ethyl(meth)acrylate, hydroxypropyl(meth)acrylate, benzyl (meth)acrylate, lauryl (meth)acrylate, oleyl(meth)acrylate, palmityl(meth)acrylate, and stearyl(meth)acrylate; and the acid-functional monethylenically unsaturated monomers used to form the shell layers are selected as at least one from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid.

6. The additive according to claim 4, wherein the outer shell layer comprises at least 5 wt. % based on the combined weight of both the inner and the outer shell layers.

7. A product composition for use in an application requiring thermal energy management, the product composition comprising the thermal insulating additive of claim 1.

8. The product composition according to claim 7, wherein the thermal energy management application is a coating application, as an additive to thermoplastics, an acoustic insulation application, a UV light protection application, or a paperboard application.

9. The product composition according to claim 7 wherein the alkaline swellable core comprises a reaction product formed from one or more hydrophilic acid-functional, monoethylenically unsaturated monomers with at least one nonionic monethylenically unsaturated monomer; the hydrophilic acid functional monomers being present in an amount ranging from about 5 wt. % to 100 wt. % and the nonionic monomers being present between 0 wt. % and about 95 wt. % based on the overall weight of the swellable core.

10. The product composition according to claim 9, wherein the hydrophilic, acid-functional monoethylenically unsaturated monomers used to form the swellable core are selected as one or more from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid; and the nonionic monethylenically unsaturated monomer are selected as at least one from styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, methyl(meth)acrylate, ethyl (meth)acrylate, butyl(meth)acrylate, 2-ethylhexyl(meth)acrylate, hydroxyl ethyl(meth)acrylate, hydroxypropyl (meth)acrylate, benzyl (meth)acrylate, lauryl (meth)acrylate, oleyl(meth)acrylate, palmityl(meth)acrylate, and stearyl(meth)acrylate.

11. The product composition according to claim 7, wherein the two or more shell layers comprise:
an inner shell layer formed as a reaction product from one or more nonionic monoethylenically unsaturated monomers with at least one acid-functional monethylenically unsaturated monomer; the acid-functional monomers being present in an amount ranging from 0 wt. % to about 95.1 wt. % and the nonionic monomers being present between about 4.9 wt. % and 100 wt. % based on the overall weight of the inner shell layer; and an outer shell layer formed as a reaction product from one or more nonionic monoethylenically unsaturated monomers with at least one acid-functional monethylenically unsaturated monomer; the acid-functional monomers being present in an amount ranging from 0 wt. % to about 15 wt. % and the nonionic monomers being present between about 85 wt. % and 100 wt. % based on the overall weight of the outer shell layer;

wherein the outer shell layer comprises at least 5 wt. % of the total or combined weight of the inner shell layer and the outer shell layer wherein the outer shell layer is more hydrophobic than the inner shell layer.

12. The product composition according to claim 11, wherein the nonionic monoethylenically unsaturated monomers used to form the shell layers are selected as one or more from the group consisting of styrene, alpha-methyl styrene, p-methyl styrene, t-butyl styrene, vinyltoluene, ethylene, vinyl acetate, vinyl chloride, vinylidene chloride, methyl (meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl(meth)acrylate, palmityl(meth)acrylate, and stearyl(meth)acrylate and the acid-functional monethylenically unsaturated monomers used to form the shell layers are selected as at least one from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid.

13. The thermal insulating additive according to claim 1 having a polydispersity of less than about 1.3.

14. A method of forming thermal insulating additive, the method comprising:

providing a plurality of hollow polymeric particles; the hollow polymeric particles being individually formed as an alkaline swellable core that is at least partially encapsulated with two or more shell layers; the alkaline swellable core exhibiting an average particle size that is less than about 50 nanometers;

allowing the alkaline swellable core in each hollow polymeric particle to swell, such that the hollow polymeric particles exhibit an average particle size up to about 0.3 micrometers; and collecting the swollen hollow polymeric particles to form the thermal insulating additive;

wherein the hollow polymeric particles exhibit a mechanical strength in a compression test up to about 420 psi and a thermal conductivity that is less than 0.150 W/m-k;

wherein the shell layers are more hydrophobic than the swellable core.

15. The method according to claim 14, wherein the method further includes forming the alkaline swellable core as a reaction product between one or more hydrophilic acid-functional, monoethylenically unsaturated monomers with at least one nonionic monethylenically unsaturated monomer;

wherein, the hydrophilic acid-functional monomers are present in an amount ranging from about 5 wt. % to 100 wt. % and the nonionic monomers are present between 0 wt. % and about 95 wt. % based on the overall weight of the swellable core.

16. The method according to claim 15, wherein the hydrophilic, acid-functional monoethylenically unsaturated monomers used to form the swellable core are selected as one or more from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid; and the nonionic monethylenically unsaturated monomer are selected as at least one from styrene, alpha-methyl styrene, p-methyl styrene, t-butyl styrene, vinyltoluene, ethylene, vinyl acetate, vinyl chloride, vinylidene chloride, (meth)acrylonitrile, (meth) acrylamide, methyl(meth)acrylate, ethyl(meth)acrylate, butyl(meth)acrylate, 2-ethylhexyl(meth)acrylate, hydroxyl ethyl(meth)acrylate, hydroxypropyl(meth)acrylate, benzyl (meth)acrylate, lauryl (meth)acrylate, oleyl(meth)acrylate, palmityl(meth)acrylate, and stearyl(meth)acrylate.

17. The method according to claim 15, wherein the method further comprises forming the two or more shell layers such that the inner shell layer and outer shell layer are individually formed as a reaction product from one or more nonionic monoethylenically unsaturated monomers with at least one acid-functional monethylenically unsaturated monomer; the outer shell layer comprising at least 5 wt. % of the total or combined weight of the inner shell layer and the outer shell layer;

wherein in the inner shell layer the acid-functional monomers are present in an amount ranging from 0 wt. % to about 95.1 wt. % and the nonionic monomers being present between about 4.9 wt. % and 100 wt. % based on the overall weight of the inner shell layer;

wherein in the outer shell layer the acid-functional monomers are present in an amount ranging from about 0 wt. % to about 15 wt. % and the nonionic monomers being present between about 85 wt. % and 100 wt. % based on the overall weight of the outer shell layer wherein the outer shell layer is more hydrophobic than the inner shell layer.

18. The method according to claim 17, wherein the nonionic monoethylenically unsaturated monomers used to form the shell layers are selected as one or more from styrene, alpha-methyl styrene, p-methyl styrene, t-butyl styrene, vinyltoluene, ethylene, vinyl acetate, vinyl chloride, vinylidene chloride, (meth)acrylonitrile, (meth)acrylamide, methyl(meth)acrylate, ethyl(meth)acrylate, butyl(meth) acrylate, 2-ethylhexyl(meth)acrylate, hydroxyl ethyl(meth) acrylate, hydroxypropyl(meth)acrylate, benzyl (meth)acrylate, lauryl (meth)acrylate, oleyl(meth)acrylate, palmityl (meth)acrylate, and stearyl(meth)acrylate; and the acid-functional monethylenically unsaturated monomers used to form the shell layers are selected as at least one from acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, and monomethyl itaconate, vinyl phosphonic acid, allyl phosphonic acid, 2-acrylamido-2-methylpropanephosphonic acid, α-phosphonostyrene, and 2-methylacrylamido-2-methylpropanephosphonic acid.

19. The method according to claim 14, wherein the method further comprises incorporating the thermal insulating additive into a product composition for use in a thermal energy management application.

20. The method according to claim 19, wherein the thermal energy management application is a coating application, as an additive to thermoplastics, an acoustic insulation application, a UV light protection application, or a paperboard application.

\* \* \* \* \*